United States Patent
Kitayama et al.

(10) Patent No.: US 11,340,471 B2
(45) Date of Patent: May 24, 2022

(54) IMAGE STABILIZATION APPARATUS, LENS APPARATUS, AND CAMERA SYSTEM

(71) Applicant: CANON KABUSHIKI KAISHA, Tokyo (JP)

(72) Inventors: Toma Kitayama, Utsunomiya (JP); Kazuhiro Noguchi, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 324 days.

(21) Appl. No.: 16/508,602

(22) Filed: Jul. 11, 2019

(65) Prior Publication Data

US 2020/0018989 A1    Jan. 16, 2020

(30) Foreign Application Priority Data

Jul. 12, 2018 (JP) .............................. JP2018-132576

(51) Int. Cl.
  *G02B 27/64* (2006.01)
  *G03B 5/00* (2021.01)
  *G02B 7/02* (2021.01)

(52) U.S. Cl.
  CPC ............. *G02B 27/646* (2013.01); *G02B 7/02* (2013.01); *G03B 5/00* (2013.01); *G03B 2205/0015* (2013.01); *G03B 2205/0069* (2013.01)

(58) Field of Classification Search
  CPC .......... G02B 27/646; G02B 7/02; G03B 5/00; G03B 2205/0015
  See application file for complete search history.

(56) References Cited

U.S. PATENT DOCUMENTS

| 8,422,129 | B2 | 4/2013 | Noguchi |
| 8,928,977 | B2 | 1/2015 | Yasuda |
| 9,256,047 | B2 | 2/2016 | Takano |
| 2017/0139225 | A1* | 5/2017 | Lim ................... G02B 7/08 |

FOREIGN PATENT DOCUMENTS

JP    2011028046 A    2/2011

* cited by examiner

*Primary Examiner* — Cara E Rakowski
(74) *Attorney, Agent, or Firm* — Rossi, Kimms & McDowell LLP

(57) ABSTRACT

An image stabilization apparatus includes a fixing member, a movable member, a guiding member movable in a first direction orthogonal to the optical axis relative to the fixed member, and configured to guide the movable member while restricting a rotation of the movable member on the plane orthogonal to the optical axis relative to the fixed member, and a rolling member rollably held between the fixed member and the guiding member. The fixing member includes a first groove extending in the first direction and contacts the rolling member. The guiding member includes a second groove that extends in the first direction and contacts the rolling member. The rolling member can contact an end of the first groove and an end of the second groove while the guiding member is located at one of ends in a movable range of the guiding member in the first direction.

10 Claims, 8 Drawing Sheets

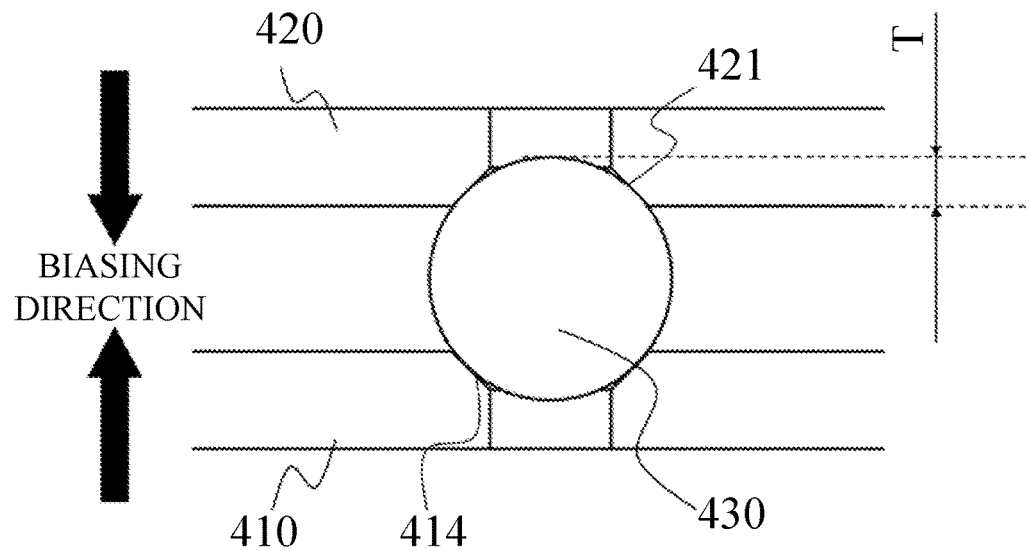
FIG. 7
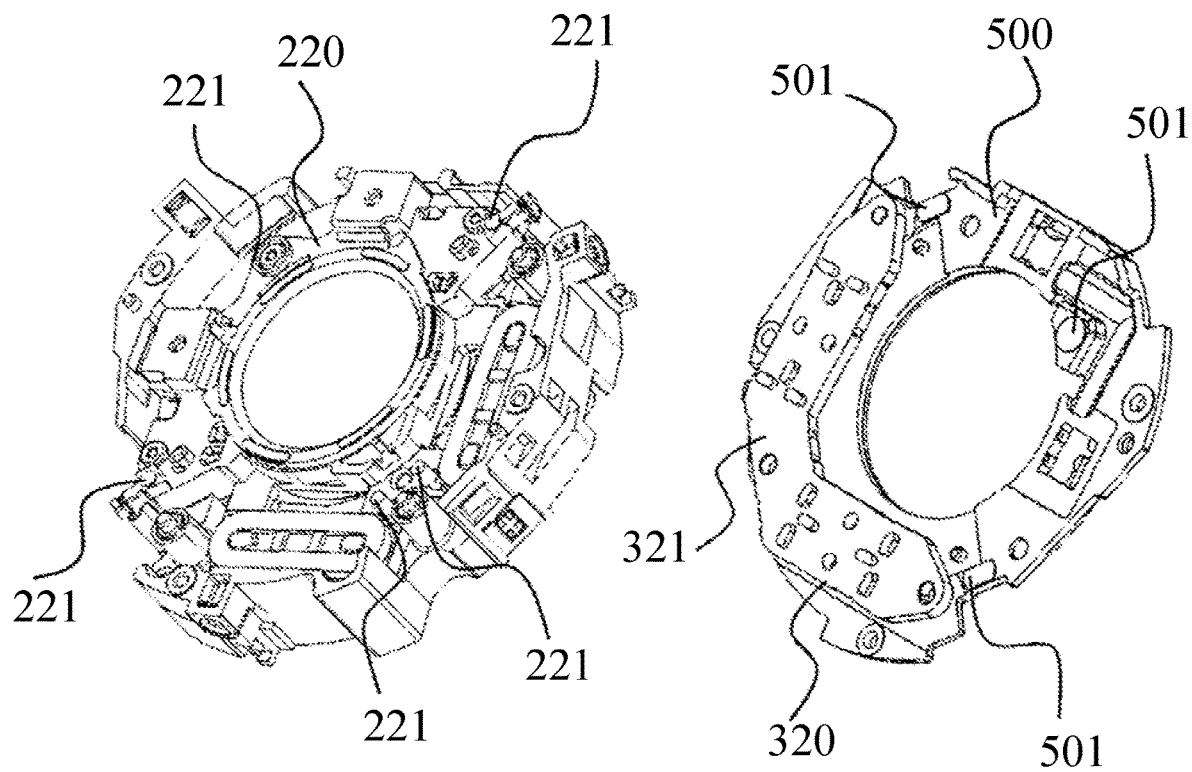
FIG. 8A
FIG. 8B

IMAGE STABILIZATION APPARATUS, LENS APPARATUS, AND CAMERA SYSTEM

BACKGROUND OF THE INVENTION

Field of the Invention

The present invention relates to an image stabilization apparatus, a lens apparatus, and a camera apparatus.

Description of the Related Art

One conventionally known image stabilization apparatus suppresses an image blur by translating part of a lens unit on a plane perpendicular to an optical axis of an imaging apparatus. For the configuration of the image stabilization apparatus, a rotation preventive mechanism has been proposed which prevents a movable lens frame from rotating around the optical axis relative to a fixed lens frame so as to improve the controllability.

Japanese Patent Laid-Open No. ("JP") 2011-28046 discloses an image stabilization apparatus including a rotation preventive mechanism using a guiding member for holding a plurality of rolling balls between a movable lens frame and a fixed lens frame. The image stabilization apparatus disclosed in JP 2011-28046 includes a restricting portion that restricts the guiding member from moving in the optical axis direction in order to prevent the rolling ball from dropping out of the groove formed in the guiding member.

In order to press a pin serving as the restricting portion into the lens barrel, the image stabilization apparatus disclosed in JP 2011-28046 needs an insertion shape on the barrel side, which may prevent the image stabilization apparatus from being made smaller. When the pin is loosened due to the poor assembly or an unexpected force is applied, the pin may drop out. In that case, the ball drops out of the groove, causing the inoperability of the image stabilization apparatus.

SUMMARY OF THE INVENTION

The present invention provides an image stabilization apparatus, a lens apparatus, and a camera system, which can be made smaller and can improve the reliability.

An image stabilization apparatus according to one aspect of the present invention includes a fixing member, a movable member configured to hold a lens and movable relative to the fixed member on a plane orthogonal to an optical axis of the lens, a guiding member movable in a first direction orthogonal to the optical axis relative to the fixed member, and configured to guide the movable member while restricting a rotation of the movable member on the plane orthogonal to the optical axis relative to the fixed member, and a rolling member rollably held between the fixed member and the guiding member. The fixing member includes a first groove that extends in the first direction and contacts the rolling member. The guiding member includes a second groove that extends in the first direction and contacts the rolling member. The rolling member is configured to be able to contact an end of the first groove and an end of the second groove while the guiding member is located at one of ends in a movable range of the guiding member in the first direction.

A lens apparatus and a camera system including the above image stabilization apparatus also constitute another aspect of the present invention.

Further features of the present invention will become apparent from the following description of exemplary embodiments with reference to the attached drawings.

BRIEF DESCRIPTION OF THE DRAWINGS

FIG. 7 is a sectional view showing a state in which a second rolling ball contacts a rolling ball contact portion.

FIGS. 8A and 8B illustrate a restricting structure of a movable lens frame in a thrust direction.

DESCRIPTION OF THE EMBODIMENTS

Figure 1:
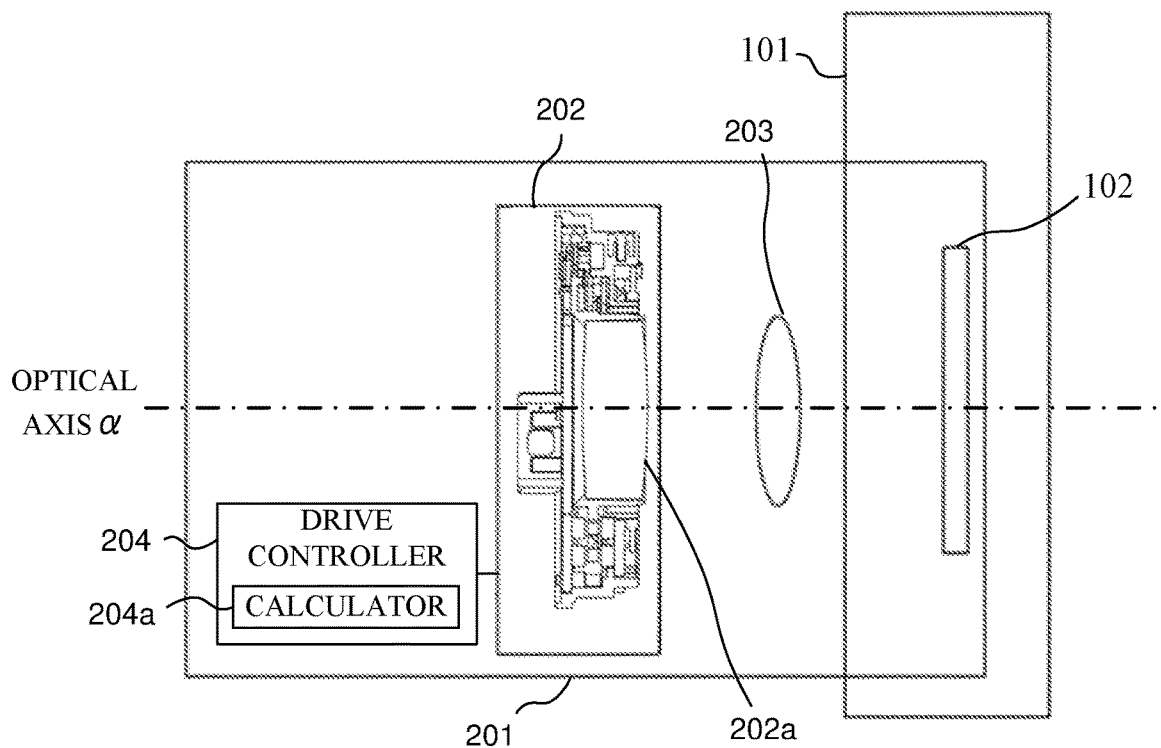
FIG. 1 is a configuration diagram of a digital still camera as an illustrative camera system according to one embodiment of the present invention.

Referring now to the accompanying drawings, a description will be given of embodiments according to the present invention. Corresponding elements in respective figures are designated by the same reference numerals, and a description thereof will be omitted.

First Embodiment

FIG. 1 illustrates a configuration of a digital still camera as an illustrative camera system 1 according to an embodiment of the present invention. The camera system 1 includes an imaging apparatus 101 and a lens barrel (lens apparatus) 201. The lens barrel 201 may be integrated with the imaging apparatus 101, or detachably attached to the imaging apparatus 101.

The imaging apparatus 101 includes an image sensor 102 that photoelectrically converts an object image formed via the lens barrel 201. The image sensor 102 mainly uses a CCD image sensor, a CMOS image sensor, etc.

The lens barrel 201 includes an image stabilization unit (image stabilization apparatus) 202 including an image stabilization lens 202a, a movable lens 203 movable along an optical axis α, and a drive controller 204 including a calculator 204a. The image stabilization unit 202 corrects an image blur by moving the image stabilization lens 202a on a plane perpendicular to the optical axis α. In FIG. 1, the image stabilization lens 202a is located at the center position (reference position) of the optical axis α. The movable lens 203 includes at least one of a zoom lens and a focus lens. The drive controller 204 drives and controls the image stabilization lens 202a based on a drive amount of the image stabilization lens 202a calculated by the calculator 204a. In addition to the image stabilization lens 202a and the movable lens 203, the lens barrel 201 has an unillustrated lens unit that constitutes an imaging optical system.

Figure 2:
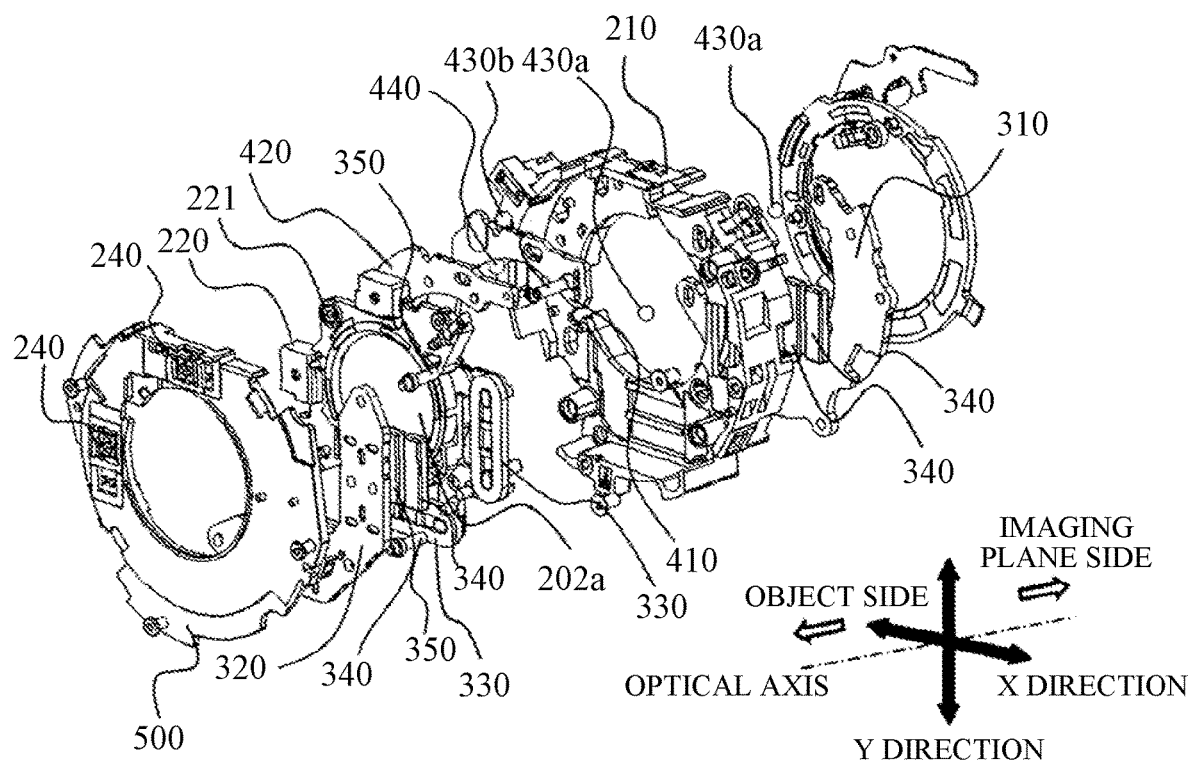
FIG. 2 is an exploded perspective view of an image stabilization unit viewed from an imaging plane side.
Figure 3:
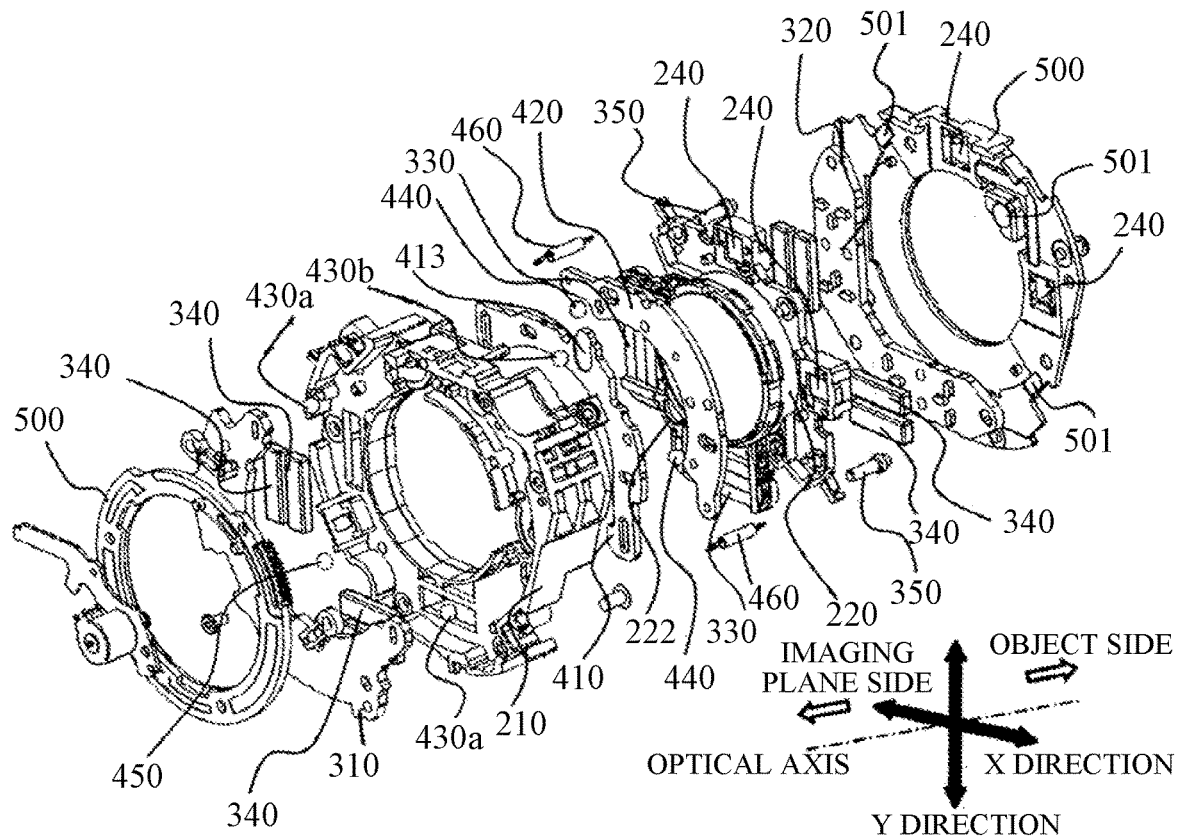
FIG. 3 is an exploded perspective view of the image stabilization unit viewed from an object side.

Referring now to FIGS. 2 and 3, a description will be given of a driving principle and configuration of the image stabilization unit 202. FIG. 2 is an exploded perspective view of the image stabilization unit 202 viewed from the imaging plane side of the image sensor 102. FIG. 3 is an exploded perspective view of the image stabilization unit 202 viewed from an object side.

A movable lens frame (movable member) 220 is a frame member that can hold the image stabilization lens 202a. A fixed lens frame (fixed member) 210 is fixed onto the lens barrel 201 in a direction perpendicular to the optical axis. The driving unit includes a first yoke 310, a second yoke 320, a shift coil 330, and a shift magnet 340. The first yoke 310 and the second yoke 320 are fixed and arranged onto the fixed lens frame 210. The second yoke 320 is disposed on the side opposite to the side where the first yoke 310 is disposed with respect to the movable lens frame 220. Two shift coils 330 are fixed onto the movable lens frame 220. The two shift coils 330 are disposed at positions separated by the same amount viewed from the center of the optical axis and shifted by 90° from each other. The shift magnet 340 is disposed on the first yoke 310. The shift magnets 340 are disposed two each at two positions overlapping the shift coil 330 viewed from the optical axis direction. The two positions are separated by the same amount from the center of the optical axis. The shift magnet 340 is also disposed on the second yoke 320. The shift magnets 340 are disposed two each at two positions overlapping the shift coil 330 viewed from the optical axis direction. The two positions are the same distance from the center of the optical axis.

A closed magnetic circuit is formed by the first yoke 310, the second yoke, and the shift magnet 340, and the first yoke 310 and the second yoke 320 attract each other by the magnetic attraction force. The shaft 350 is disposed between the first yoke 310 and the second yoke 320, and prevents each yoke and the fixed lens frame 210 from being deformed by the magnetic attraction force. When the shift coil 330 is energized in the magnetic circuit, the movable lens frame 220 moves in the X and Y directions by the electromagnetic interaction of the coil and the magnet. Hence, the movable lens frame 220 is movable in the X and Y directions on a plane perpendicular to the optical axis relative to the fixed lens frame 210.

A position detector 240 detects a moving amount of the movable lens frame 220 relative to the fixed lens frame 210. The position detector 240 uses, for example, a Hall element using the Hall effect or the like. This embodiment provides a Hall sensor as a detector on a stopper member 500 fixed by screws so that it is integrated with the fixed lens frame 210, and a Hall magnet as a detected portion on a movable lens frame 220. The position detector 240 is disposed at positions separated by the same amount from the center of the optical axis and shifted by 90° from each other. This arrangement enables the position detector 240 to detect the position of the movable lens frame 220 relative to the fixed lens frame 210 in the X and Y directions.

Figure 4:
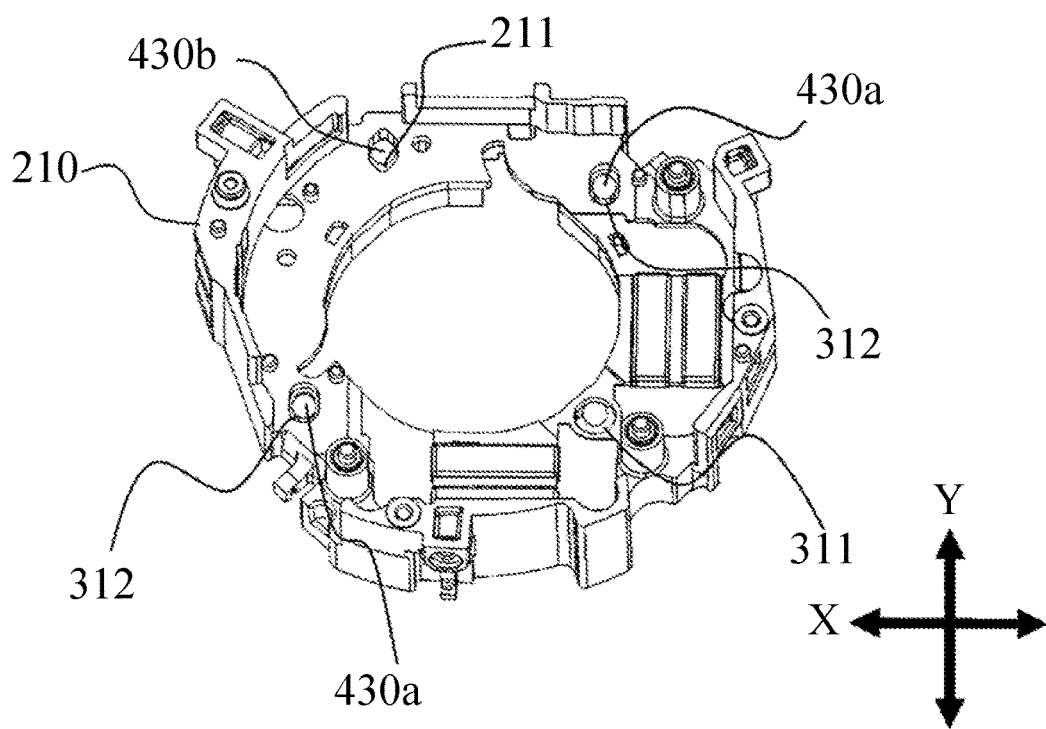
FIG. 4 illustrates a first yoke attached to a fixed lens frame viewed from the object side.
Figure 5:
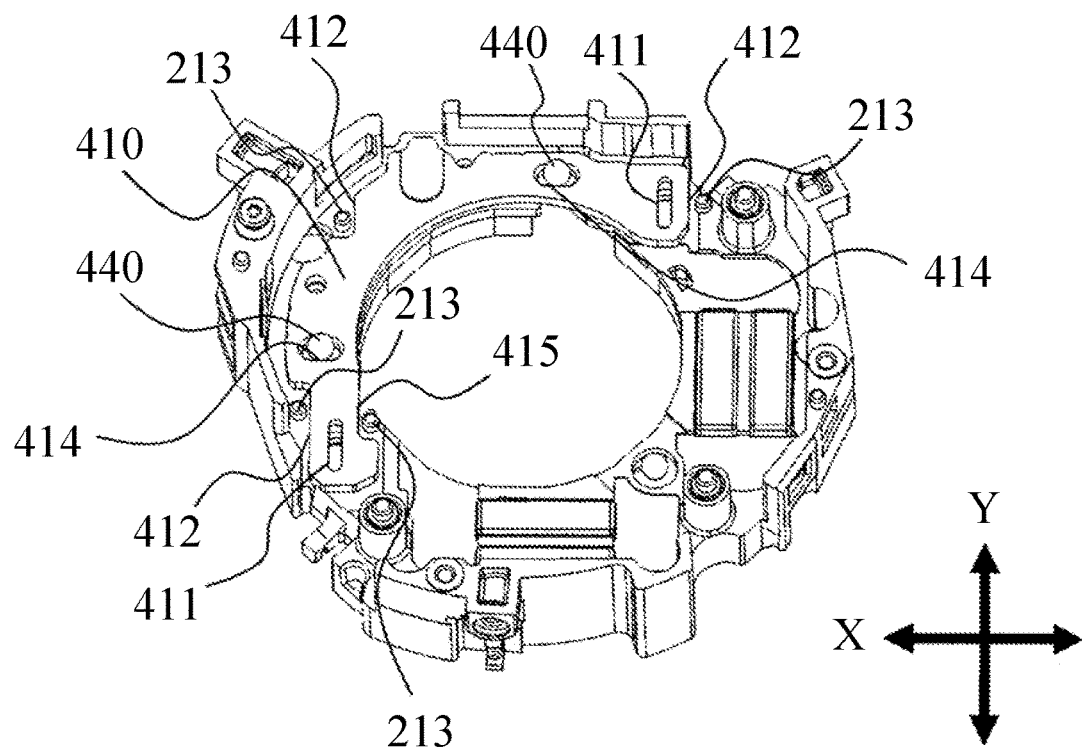
FIG. 5 illustrates a first antiroll plate attached to a unit in the state in FIG. 4 viewed from the object side.
Figure 6:
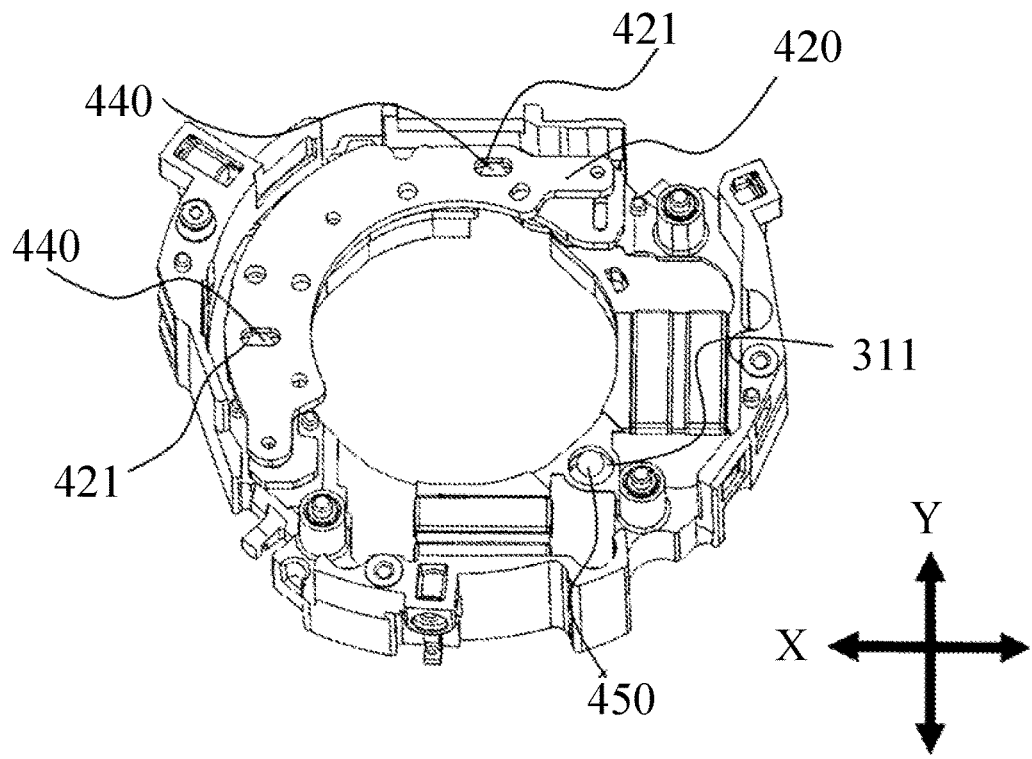
FIG. 6 illustrates a second antiroll plate attached to a unit in the state in FIG. 5 viewed from the object side.

Referring now to FIGS. 4 to 6, a description will be given of a rotation preventive mechanism of the image stabilization unit 202. FIG. 4 illustrates the first yoke 310 attached to the fixed lens frame 210 viewed from the object side, where the attached first yoke 310 and fixed lens frame 210 may constitute the fixed member. FIG. 5 illustrates the first antiroll plate 410 attached to the unit in the state of FIG. 4 viewed from the object side. FIG. 6 illustrates the second antiroll plate 420 attached to the unit in the state of FIG. 5 viewed from the object side.

The first yoke 310 has a rolling ball contact portion 311 and a rolling ball contact portion (first groove) 312. The rolling ball contact portion 312 has a guide groove shape formed by an elongated hole. The movable lens frame 220 has a rolling ball contact portion 222, as illustrated in FIG. 3. The fixed lens frame 210 has a rolling ball contact portion 211. The first rolling ball 430, the second rolling ball 440, and the third rolling ball 450 are spherical members, and made of, for example, ceramic. The first rolling ball 430 includes a first rolling ball (rolling member) 430a that contacts the two rolling ball contact portions 312, and a first rolling ball 430b that contacts the rolling ball contact portion 211. The third rolling ball 450 contacts the rolling ball contact portion 311.

The first antiroll plate 410 has a rolling ball contact portion (second groove) 411, a rolling ball contact portion 413 illustrated in FIG. 3, and a rolling ball contact portion 414. The rolling ball contact portion 411 and the rolling ball contact portion 414 have a guide groove shape formed by an elongated hole. The two first rolling balls 430a that contact the rolling ball contact portion 312 contact the rolling ball contact portion 411. The first rolling ball 430b that contacts the rolling ball contact portion 211 contacts the rolling ball contact portion 413. The two second rolling balls 440 contact the rolling ball contact portion 414. The longitudinal direction of the rolling ball contact portion 411 coincides with the Y direction, and the first antiroll plate 410 is movable only in the Y direction relative to the fixed lens frame 210.

The second antiroll plate 420 has a rolling ball contact portion 421. The rolling ball contact portion 421 has a guide groove shape formed by an elongated hole. The rolling ball contact portion 421 is provided such that its longitudinal direction (X direction) is orthogonal to the longitudinal direction (Y direction) of the rolling ball contact portion 411. The two second rolling balls 440 contact the rolling ball contact portion 421. The longitudinal direction of the rolling ball contact portion 421 coincides with the X direction, and the second antiroll plate 420 is movable only in the X direction relative to the first antiroll plate 410.

The movable lens frame 220 is fixed onto the second antiroll plate 420 with a screw or the like. The third rolling ball 450 that contacts the rolling ball contact portion 311 contacts the rolling ball contact portion 222. Therefore, the movable lens frame 220 is supported by three rolling balls.

With the above configuration, the movable lens frame 220 can move only in the first direction (X direction) and the second direction (Y direction) on the plane perpendicular to the optical axis relative to the fixed lens frame 210 without rotating. Restraining the movable lens frame 220 from rotating can prevent an erroneous detection by the position detector 240.

This embodiment makes the first direction and the second direction orthogonal to each other, but the present invention is not limited to this embodiment. The first direction and the second direction may be predetermined directions different from each other on the plane perpendicular to the optical axis.

Referring now to FIG. 7, a description will be given of a configurations of the antiroll plate and the rolling ball. FIG. 7 is a sectional view taken along the plane orthogonal to the longitudinal direction of each contact portion and passing through the center position of the second rolling ball 440, and illustrates the state in which the second rolling ball 440 contacts the rolling ball contact portion 414 and the rolling ball contact portion 421.

The rolling ball contact portions 414 and 421 have a surface that contacts the second rolling ball 440 and forms 45° with the plane perpendicular to the optical axis α. The movable lens frame 220 is integrated with the second antiroll plate 420, and biased by a coil spring 460 at three points through a force that pull the movable lens frame 220 to the fixed lens frame 210 side (imaging plane side). This biasing force biases the first antiroll plate 410 and the second antiroll plate 420 in the direction approaching to the first yoke 310 in the optical axis direction, and prevents the rolling ball from floating from the contact portion. The rolling balls that contact the other contact portions can also roll without rattling by the same configuration. Thus, the movable lens frame 220 can move on the plane orthogonal to the optical axis without rotating there.

Figure 9:
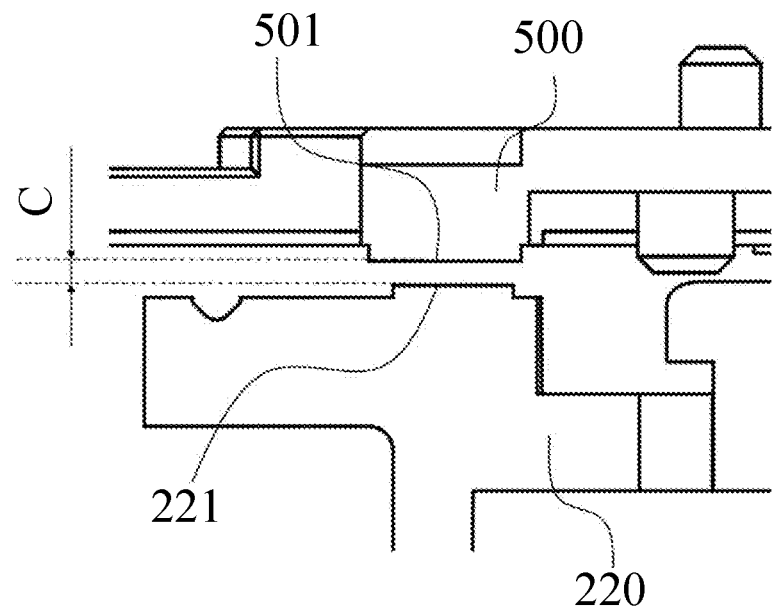
FIG. 9 is a sectional view of the restricting structure of the movable lens frame in the thrust direction.

Next follows a description of characteristic part of the present invention. FIGS. 8A and 8B illustrate the restricting structure of the movable lens frame 220 in the thrust direction (optical axis direction). FIG. 8A illustrates the movable lens frame 220 viewed from the object side, and FIG. 8B illustrates the stopper member 500 viewed from the imaging plane side. FIG. 9 is a sectional view of the restricting structure of the movable lens frame 220 in the thrust direction.

In the rotation preventive mechanism according to this embodiment, the coil spring 460 performs biasing in the optical axis direction so that the rolling ball and the contact portion always contact each other. However, when a force equal to or greater than the biasing force of the coil spring 460 acts due to the external impact or the like, the movable lens frame 220 may move in the optical axis direction. In order to restrict a movement of the movable lens frame 220 in the optical axis direction, the movable lens frame 220 in this embodiment includes a thrust restricting surface 221, and the stopper member 500 includes a thrust restricting portion 501. The second yoke 320 also has a yoke thrust surface 321. The yoke thrust surface 321 and the thrust restricting portion 501 are disposed to face the thrust restricting surface 221 in the optical axis direction. With this configuration, when the movable lens frame 220 floats up in the optical axis direction due to the external impact or the like, the above opposing members contact each other and the movable lens frame 220 in the optical axis direction is restricted from moving.

When the opposing members come into contact with each other at the normal time, the performance of the image stabilization unit 202 may be degraded. Thus, the clearance C among the thrust restricting surface 221, the thrust restricting portion 501, and the yoke thrust surface 321 needs to be equal to or more than a predetermined value in consideration of the tolerance of the related part. On the other hand, when the movable lens frame 220 floats up due to the external impact, etc., the rolling ball does not drop out of the groove in the contact portion, and thus the clearance C needs to be always smaller than a penetration amount T (shown in FIG. 7) relative to the antiroll plate of the roll ball in consideration for the allowance.

Figure 10:
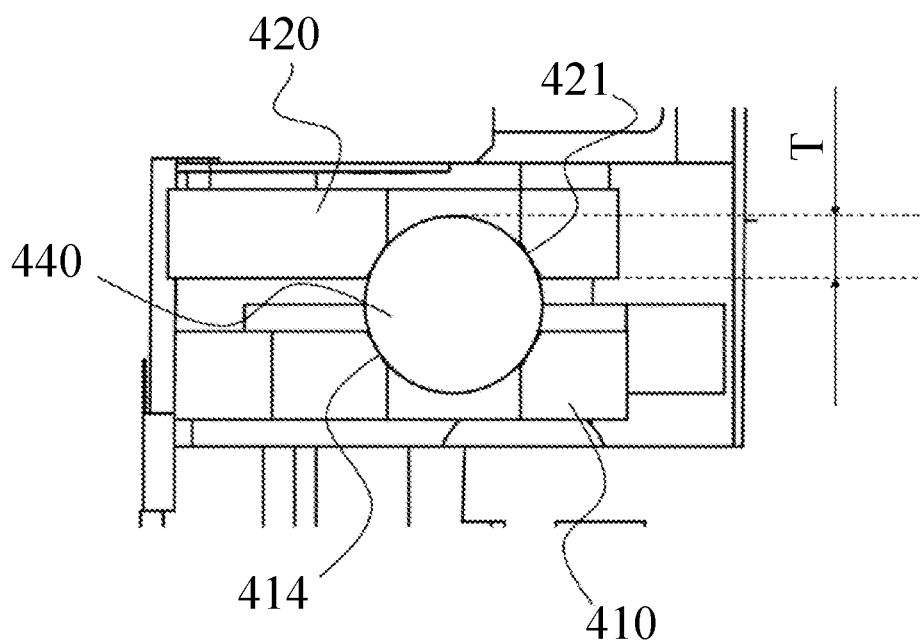
FIG. 10 is a sectional view taken by a plane perpendicular to the longitudinal direction of a contact portion of the second rolling ball.
Figure 11:
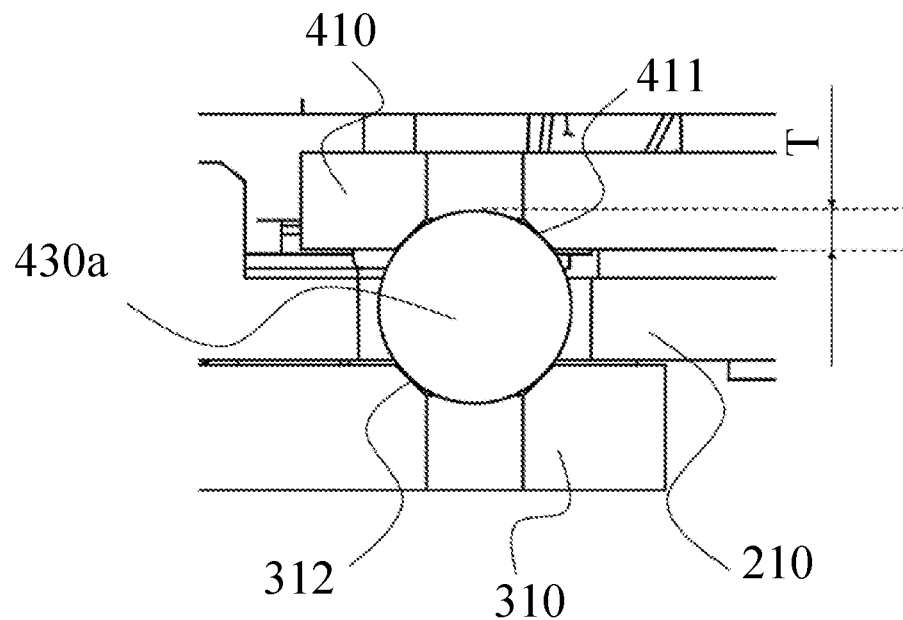
FIG. 11 is a sectional view taken by the plane perpendicular to the longitudinal direction of a contact portion of the first rolling ball.

FIG. 10 is a sectional view of the second rolling ball 440 taken along the plane orthogonal to the longitudinal direction of the contact portion. FIG. 11 is a sectional view of the first rolling ball 430a taken along the plane orthogonal to the longitudinal direction of the contact portion. As illustrated in FIG. 10, the penetration depth of the second rolling ball 440 from the first antiroll plate 410 and the second antiroll plate 420 is sufficiently deep. Thereby, even when the movable lens frame 220 is lifted by the external impact or the like, the second rolling ball 440 can be prevented from dropping out. In this case, the clearance between the first antiroll plate 410 and the second antiroll plate 420 may be set to such an extent that the respective members do not contact each other. As illustrated in FIG. 11, the fixed lens frame 210 is disposed between the first yoke 310 and the first antiroll plate 410. The thickness of the fixed lens frame 210 needs to be a predetermined thickness or more, but the clearance between the fixed lens frame 210 and the first antiroll plate 410 also needs to be set such that the respective members do not contact each other. Thus, the penetration depth of the first rolling ball 430a from the first yoke 310 and the first antiroll plate 410 cannot be made sufficiently deep.

Figure 12:
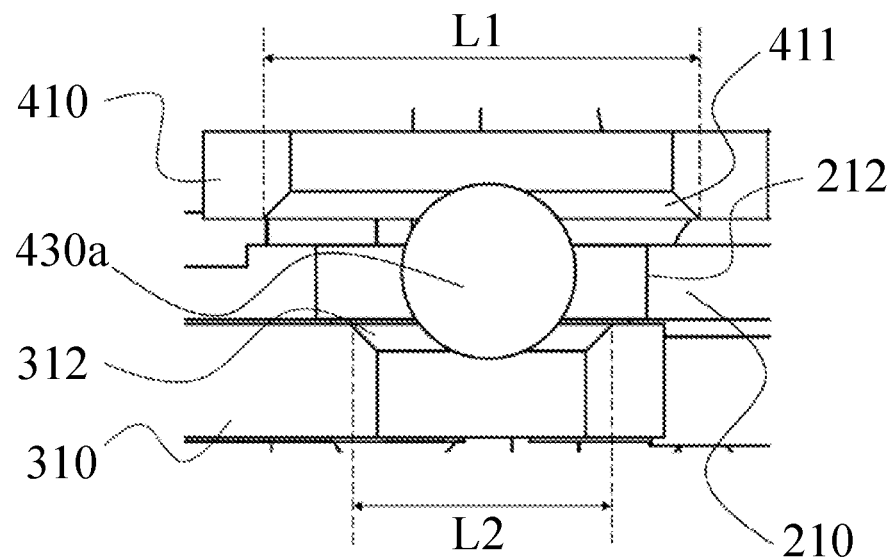
FIG. 12 illustrates a length in the longitudinal direction of the two contact portions that contact the first rolling ball.

The conventional configuration have inserted the restriction pin into the fixed lens frame 210 and used it as a float stop of the first antiroll plate 410. This embodiment eliminates the restriction pin in order to make small the image stabilization unit 202. FIG. 12 illustrates the lengths of the rolling ball contact portion 411 and the rolling ball contact portion 312 in the longitudinal direction. A length L1 of the rolling ball contact portion 411 is set to be longer than a length L2 of the rolling ball contact portion 312.

Figure 13:
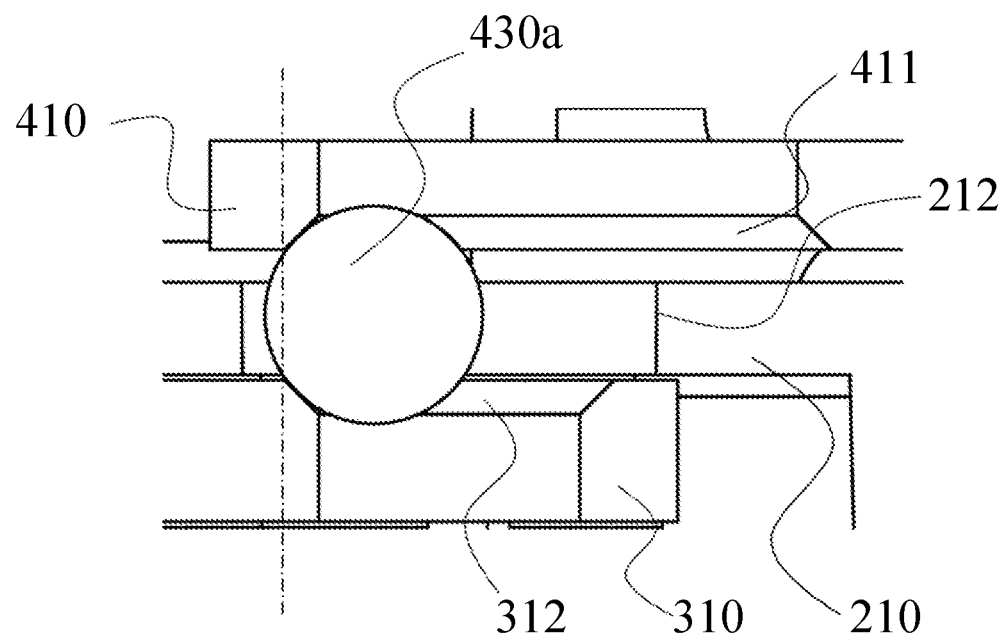
FIG. 13 is a sectional view taken along a plane parallel to the longitudinal direction of the contact portion of the first rolling ball when the antiroll plate moves to the first end of the movement range.
Figure 14:
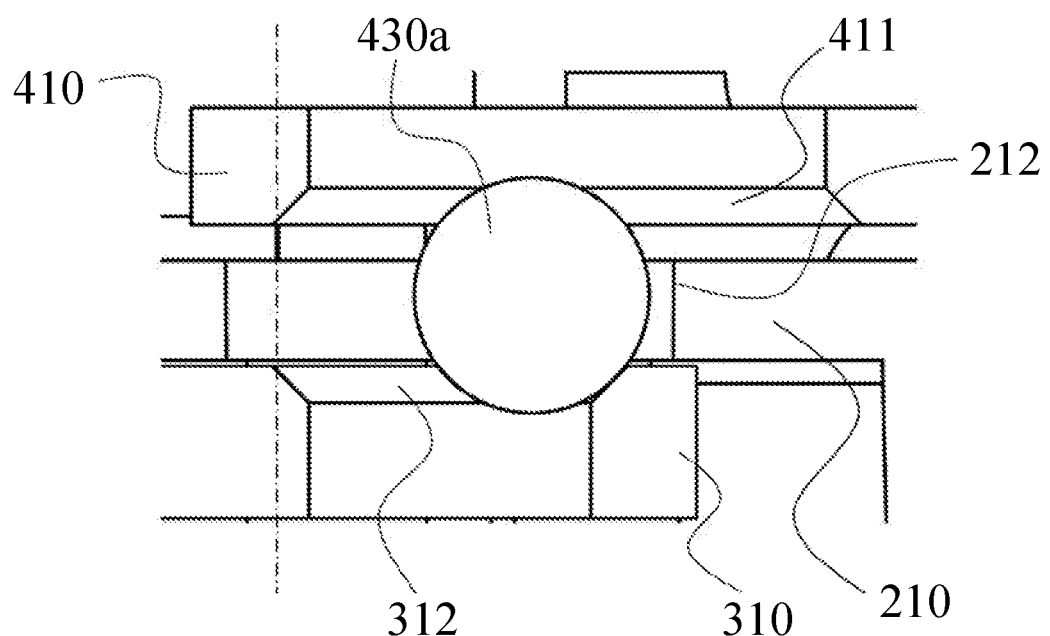
FIG. 14 is a sectional view taken along a plane parallel to the longitudinal direction of the contact portion of the first rolling ball when the antiroll plate moves to the first end of the movement range.

FIG. 13 is a sectional view taken along the plane parallel to the longitudinal direction of the two contact portions in contact with the first rolling ball 430a and illustrates the state where the antiroll plate 410 moves to the first end of the movement range. FIG. 14 is a sectional view taken along a plane parallel to the longitudinal directions of the two contact portions that contact the first rolling ball 430a and illustrates the state in which the antiroll plate 410 moves to the first end of the movement range. The position of the rolling ball 430a in FIG. 14 is closer to the end opposite to the position in FIG. 13 in the movable range of the rolling ball 430a.

More specifically, FIG. 14 illustrates that the antiroll plate 410 moves from the state illustrate in FIG. 12 in the usual utilization state to the right direction on the paper plane and reaches the first end in the moving range. FIG. 13 illustrates that the antiroll plate 410 floats in the upper direction on the paper plane due to the external or drop impact etc. and the first rolling ball 430a rolls in the left direction on the paper from the state illustrated in FIG. 14.

As illustrated in FIGS. 12 to 14, the rolling ball contact portion 411 and the rolling ball contact portion 312 always exist above and below the first rolling ball 430a. This positional relationship is similar even when the antiroll plate 410 moves to the second end (end opposite to the first end). Thus, even when the first antiroll plate 410 floats up in the optical axis direction, the first rolling balls 430a do not drop out of the contact portion, as illustrated in FIG. 13.

This embodiment provides the fixed lens frame 210 with the rolling ball restricting portion 212 that restricts the first rolling ball 430a from moving in the direction orthogonal to the optical axis. The rolling ball restricting portion 212 is a wall surface portion parallel to the optical axis. In addition, as described above, the rolling ball contact portions 312 and 411 always exist above and below the first rolling ball 430a at the first and second ends in the movement range of the first antiroll plate 410. The above configuration can suppress the dropout of the first antiroll plate 410 in the moving direction. In addition, when the first antiroll plate 410 moves to the first end or the second end in the movement range, the end of the rolling ball contact portion 411 may be closer to the outside than the end of the rolling ball contact portion 312 or coincide with the end of the rolling ball contact portion 312.

Figure 15:
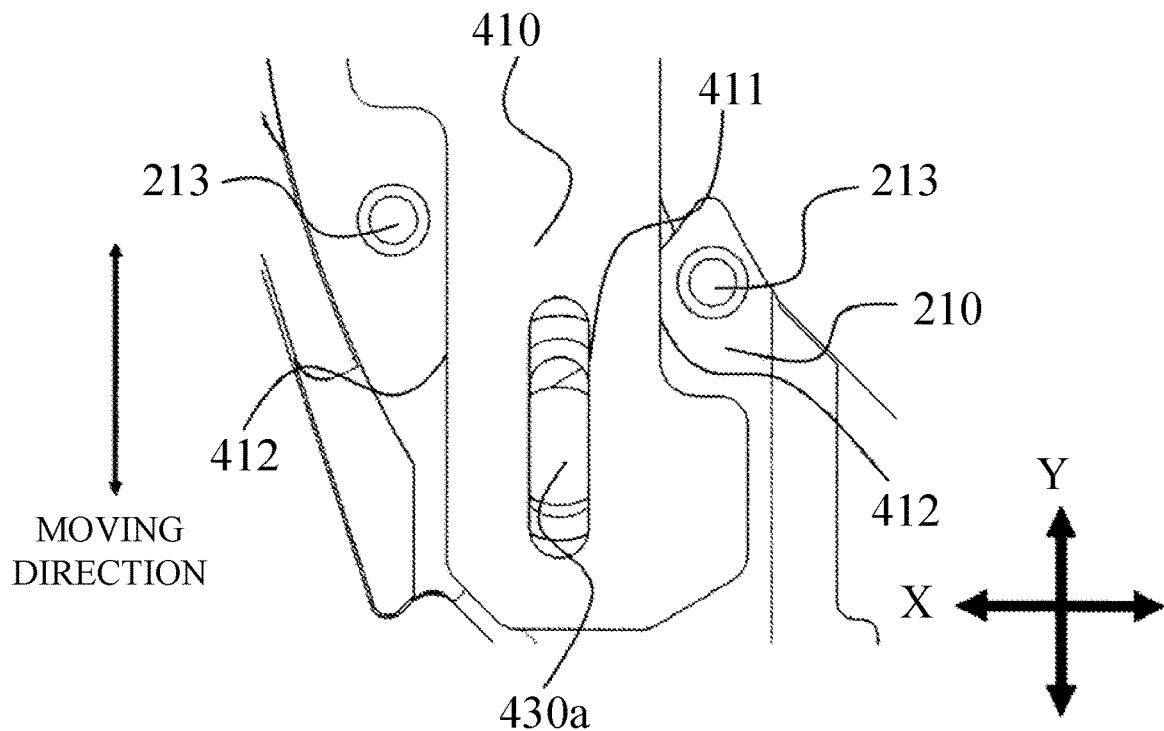
FIG. 15 explains a drop preventive structure of the first rolling ball in a direction orthogonal to the moving direction of the first antiroll plate.

FIG. 15 explains the dropout preventive structure of the first rolling ball 430 in the direction (X direction) orthogonal to the moving direction of the first antiroll plate 410. This embodiment provides guide restricting portions 213 at four locations, each of which has a boss shape extending in the optical axis direction from the fixed lens frame 210. The first antiroll plate 410 can contact the guide restricting portion 213, and includes a flat portion (contact portion) 412 parallel to the moving direction (Y direction). The guide restricting portion 213 is disposed apart from the flat portion 412 in the direction (X direction) orthogonal to the moving direction of the first antiroll plate 410. When the impact or the like is applied to the image stabilization unit 202 and the first antiroll plate 410 moves in the X direction, the guide restricting portion 213 contacts the flat portion 412 and restricts the first antiroll plate 410 from moving in the X direction. The rolling ball regulating portion 212 also restricts the first rolling ball 430 from shifting in the X direction. Hence, the first rolling ball 430a can be prevented from dropping out of the contact portion in the direction (X direction) orthogonal to the moving direction of the first antiroll plate 410.

Since the flat portion 412 is parallel to the moving direction (Y direction) of the first antiroll plate 410, a distance between the flat portion 412 and the guide restricting portion 213 becomes constant irrespective of the position of the first antiroll plate 410 in the Y direction. The clearance between the flat portion 412 and the guide restricting portion 213 may be set so that respective members do not contact each other even when the relative position shifts due to the tolerance of these members.

As described above, this embodiment can suppress the dropout of the rolling ball of the rotation preventive structure without using the restriction pin used for the conventional configuration.

Second Embodiment

Figure 16:
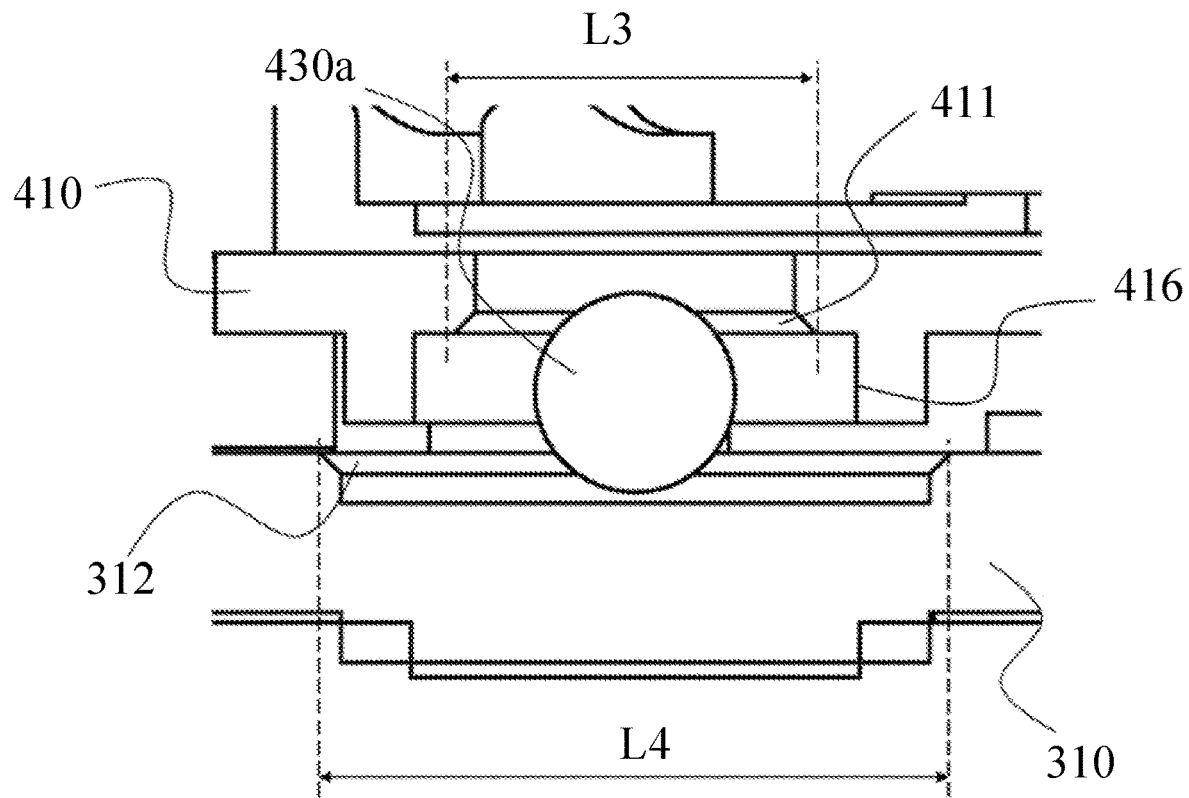
FIG. 16 illustrates a length in the longitudinal direction of the contact portion that contacts the first rolling ball according to a second embodiment.

FIG. 16 illustrates lengths of the rolling ball contact portion 411 and the rolling ball contact portion 312 in the longitudinal directions. In this embodiment, the first antiroll plate 410 includes a rolling ball restricting portion 416 that restricts the first rolling ball 430 from moving in the direction orthogonal to the optical axis. A length L3 of the rolling ball contact portion 411 is set to be shorter than a length L4 of the rolling ball contact portion 312. When the first antiroll plate 410 moves to the first end or the second end in the movement range, the end of the rolling ball contact portion 312 may be closer to the outside than the end of the rolling ball contact portion 411 or coincide with the end of the rolling ball contact portion 411.

With the above configuration, this embodiment can suppress, similar to the first embodiment, the dropout of the rolling ball of the rotation preventive structure without using the restriction pin used for the conventional configuration.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-132576, filed on Jul. 12, 2018, which is hereby incorporated by reference herein in its entirety.

What is claimed is:

1. An image stabilization apparatus comprising:
a fixed member;
a movable member configured to hold a lens and movable relative to the fixed member on a plane orthogonal to an optical axis of the lens;
a guiding member movable in a first direction orthogonal to the optical axis relative to the fixed member, and configured to guide the movable member while restricting a rotation of the movable member on the plane orthogonal to the optical axis relative to the fixed member; and
a rolling member rollably held between the fixed member and the guiding member,
wherein the fixed member includes a first groove that extends in the first direction and contacts the rolling member,
wherein the guiding member includes a second groove that extends in the first direction and contacts the rolling member, and
wherein the rolling member is configured to be able to contact an end of the first groove and an end of the second groove while the guiding member is located at one of ends in a movable range of the guiding member in the first direction.

2. The image stabilization apparatus according to claim 1, further comprising a biasing member configured to bias the movable member against the fixed member.

3. The image stabilization apparatus according to claim 1, further comprising a first stopper member configured to restrict a movement of the movable member in the optical axis direction.

4. The image stabilization apparatus according to claim 3, wherein the fixed member includes a second stopper member configured to restrict a movement of the guiding member in a second direction orthogonal to the optical axis direction and the first direction.

5. The image stabilization apparatus according to claim 4, wherein the guiding member includes a contact portion configured to contact the second stopper member, and extending parallel to the first direction.

6. The image stabilization apparatus according to claim 1, wherein any one of the fixed member and the guiding member includes a restricting portion configured to restrict a movement range of the rolling member on the plane orthogonal to the optical axis.

7. The image stabilization apparatus according to claim 6, wherein one of the first groove and the second groove, which is provided to a member including the restricting portion is longer than the other of the first groove and the second groove.

8. The image stabilization apparatus according to claim 1, wherein when the guiding member is located at a first end or a second end in the movable range, an end of a longer one of the first groove and the second groove is located at or outside of an end of a shorter one of the first groove and the second groove.

9. A lens apparatus comprising:
an image stabilization apparatus; and
a movable lens movable along an optical axis,
wherein the image stabilization apparatus includes:
a fixed member;
a movable member configured to hold a lens and movable relative to the fixed member on a plane orthogonal to an optical axis of the lens;
a guiding member movable in a first direction orthogonal to the optical axis relative to the fixed member, and configured to guide the movable member while restricting a rotation of the movable member on the plane orthogonal to the optical axis relative to the fixed member; and
a rolling member rollably held between the fixed member and the guiding member,
wherein the fixed member includes a first groove that extends in the first direction and contacts the rolling member,
wherein the guiding member includes a second groove that extends in the first direction and contacts the rolling member, and
wherein the rolling member is configured to be able to contact an end of the first groove and an end of the second groove while the guiding member is located at one of ends in a movable range of the guiding member in the first direction.

10. A camera system comprising:
a lens apparatus; and
an image sensor configured to photoelectrically convert an object image formed via the lens apparatus,
wherein the lens apparatus includes:
an image stabilization apparatus; and
a movable lens movable along an optical axis,
wherein the image stabilization apparatus includes:
a fixed member;
a movable member configured to hold a lens and movable relative to the fixed member on a plane orthogonal to an optical axis of the lens;
a guiding member movable in a first direction orthogonal to the optical axis relative to the fixed member, and configured to guide the movable member while restricting a rotation of the movable member on the plane orthogonal to the optical axis relative to the fixed member; and
a rolling member rollably held between the fixed member and the guiding member,
wherein the fixed member includes a first groove that extends in the first direction and contacts the rolling member,
wherein the guiding member includes a second groove that extends in the first direction and contacts the rolling member, and
wherein the rolling member is configured to be able to contact an end of the first groove and an end of the second groove while the guiding member is located at one of ends in a movable range of the guiding member in the first direction.

* * * * *